July 7, 1936.  A. C. HORNER  2,046,949
COMBINED SEATING TOOL, WASHER, AND STRAP CONNECTION
Filed Oct. 1, 1935  2 Sheets-Sheet 1
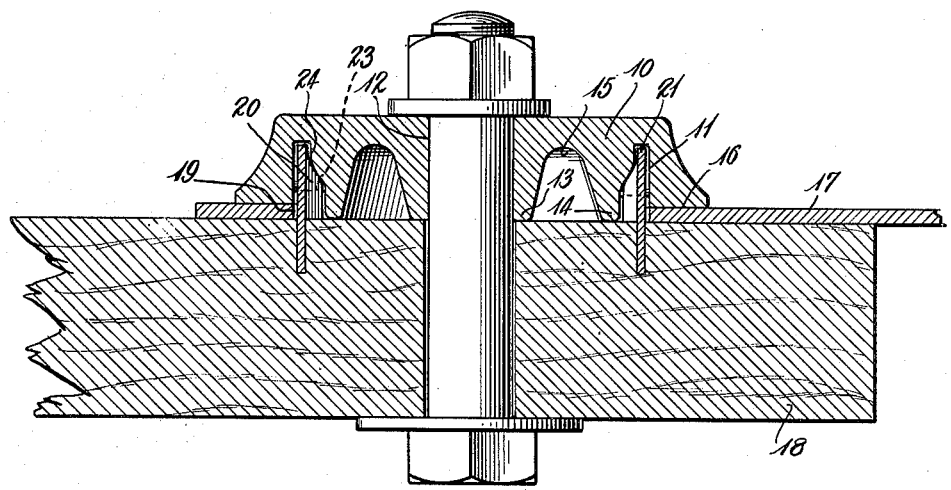
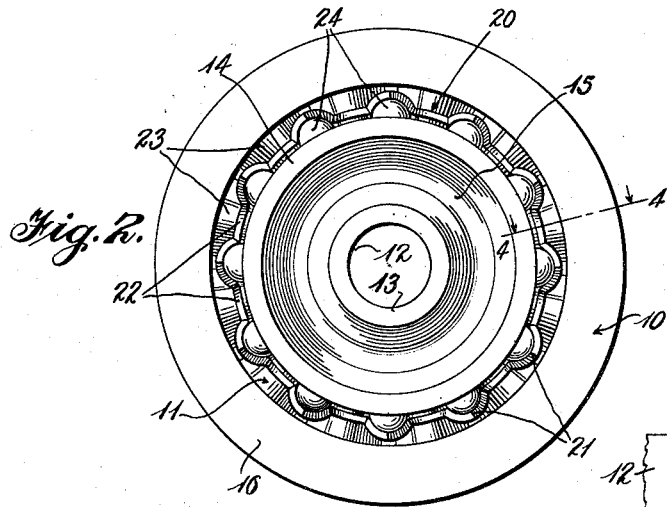
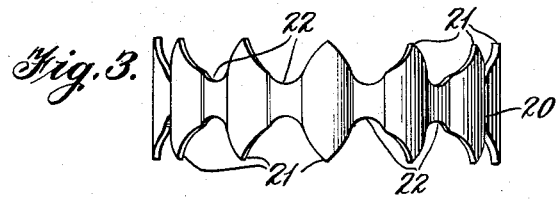
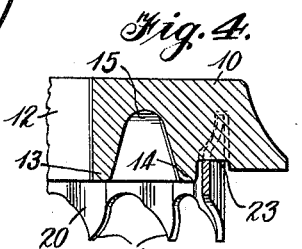
Inventor
Arthur C. Horner
By Brown & Phelps
Attorneys July 7, 1936.    A. C. HORNER    2,046,949
COMBINED SEATING TOOL, WASHER, AND STRAP CONNECTION
Filed Oct. 1, 1935    2 Sheets-Sheet 2

Inventor
Arthur C. Horner
By Brown & Phelps
Attorneys

Patented July 7, 1936

2,046,949

UNITED STATES PATENT OFFICE 2,046,949

COMBINED SEATING TOOL, WASHER, AND STRAP CONNECTION

Arthur C. Horner, San Francisco, Calif., assignor to Timber Engineering Company, Washington, D. C., a corporation of Delaware Application October 1, 1935, Serial No. 43,097

7 Claims. (Cl. 20—92)

The invention relates to the utilization of connector rings and has as an object the provision of a device that may be used either as a seating tool or a toothed type of connector ring, or as a washer for use with such a ring for a strap connection.

It is a further object of the invention to provide a novel form of strap and timber connection utilizing the washer of the invention.

Further objects of the invention will appear from the following description when read in connection with the accompanying drawings showing illustrative embodiments of the invention, and wherein:—

Figure 1 is a central vertical section of a washer and ring shown as clamping a strap upon a timber;

Fig. 2 is a bottom plan view of the washer and ring of Fig. 1;

Fig. 3 is a side elevation of a type of connector ring which may be seated by means of the tool of the invention;

Fig. 4 is a detail vertical section on line 4—4 of Fig. 2;

Figure 7:
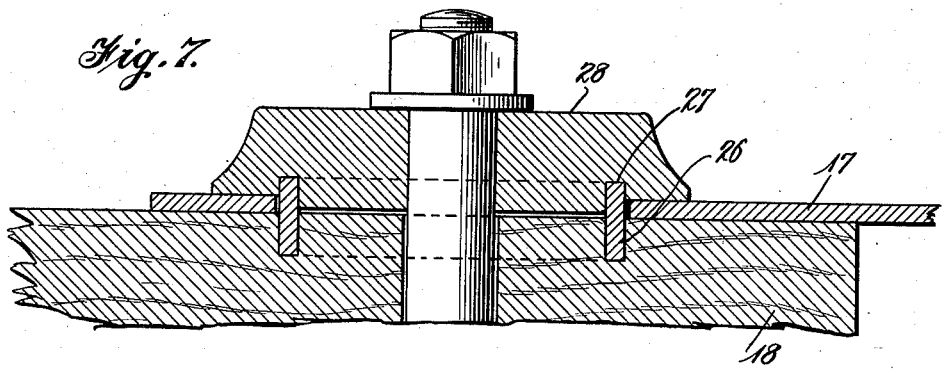
Fig. 7 is a view similar to Fig. 1 showing the device considered as a washer in combination with a different form of connector ring.
Figure 5:
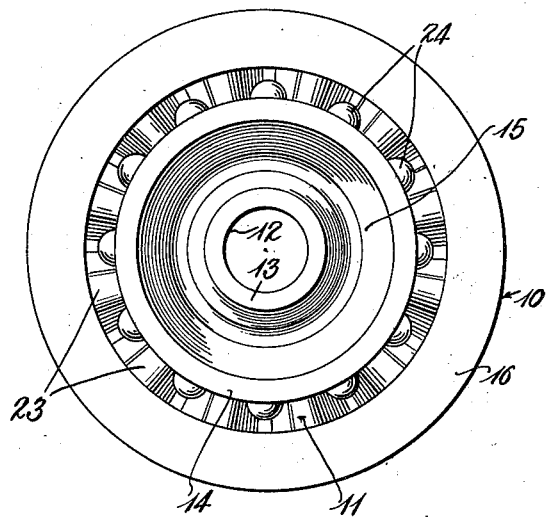
Fig. 5 is a bottom plan view of the device with the connector ring omitted.

In the seating of the connectors of the type shown in Fig. 3, it has been the custom to place the rings between two timbers concentric with bolt holes therein and to pass a bolt through the two timbers which upon being tightened causes the teeth of the ring to penetrate the material of the timbers. This has required a bolt of a length equal to the combined thickness of the timbers plus the height of the ring plus a required length of thread, in order to be able to start a nut upon the bolt to apply seating force upon the ring.

For the purpose of seating such rings, a metallic washer 10 is provided by the invention formed with an annular groove 11 and a central bolt hole 12. About the bolt hole there is shown a central projection 13 and an annular rib 14 shown as separated by an annular groove 15. The groove 15 however has a sole function of lightening the device to save material in the casting thereof. The device is desirably formed of malleable iron.

Exterior of the groove 11, there is shown a surface 16, which in the form of Fig. 1 is shown as coming into contact with a strap 17 which is to be secured to the timber 18.

The strap 17 is shown as formed with an opening 19 of a size to slip over the exterior of the connector ring and when so used the strap will be reinforced against deformation by the presence of the rib 14 interiorly thereof.

It is understood that the ring 20, as in Fig. 3, will be placed upon the timber, the washer placed thereon, and force applied to the washer to sink the teeth 21 of the ring into the material of the timber as for instance, by blows of a sledge. If desired, when the part 17 is to become a part of the structure, the part may be placed before the ring is added.

To transfer force to the ring at the bottoms 22 of the depressions between the teeth, the groove 11 in the device is shown as formed with upstanding ridges 23, therefore the impact upon the washer not falling upon the points of the teeth will be enabled to seat the ring without bending the teeth. To further support the teeth where they project into the groove 11, the interior of the vertical wall of the groove is shown as sloping outwardly as at 24.

Figure 6:
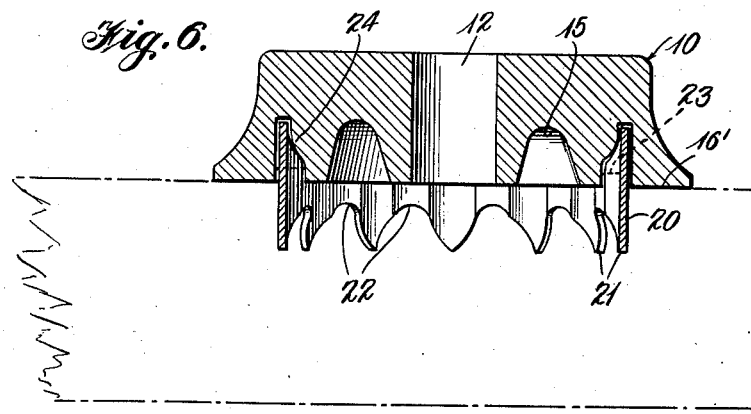
Fig. 6 is a central vertical section of the device formed for use as a seating tool only.

In the form of Fig. 6 where the device is to be used merely as a seating tool, the surface 16' is flush with the surface 25 of the ridge 14 so that the two surfaces may come into contact with the timber at the same time to determine the depth at which the ring will be seated.

In Fig. 7 is shown the combination of the strap 17 and timber 18 with a plain connector ring 26. As shown in said figure, the groove 27 in the washer 28 is a plain groove and the depression 15 of Fig. 1 is omitted, in which case the washer may be made of less thickness if desired to still preserve its full strength.

Minor changes may be made in the physical embodiments of the invention within the scope of the appended claims without departing from the spirit thereof.

I claim:

1. In a device of the class described, in combination: a metallic body having a preformed annular groove to receive a projecting portion of a connector ring impinging the bottom of said groove and a central sighting opening of less diameter than that of said groove whereby to align the center of the body with an existing bolt hole.

2. In a device of the class described, in combination: a metallic body having a preformed annular groove to receive a projecting portion of a connector ring and a central sighting opening whereby to align the center of the body with an existing bolt hole; and a surface extending in a plane normal to the axis of the device to determine the penetration of the ring into material in which the ring is to be seated.

3. In a device of the class described for seating a connector ring having oppositely directed penetrating teeth: a metallic body having a preformed annular groove to receive the teeth projecting in one direction upon the ring; and preformed radial ridges upstanding from the bottom of the groove to transmit seating force applied to a ring to the bottoms of depressions between the teeth thereof.

4. In a device of the class described for seating a connector ring having oppositely directed penetrating teeth: a metallic body having a preformed annular groove to receive the teeth projecting in one direction upon the ring; preformed ridges upstanding from the bottom of the groove to transmit seating force applied to a ring to the bottoms of depressions between the teeth thereof; said body presenting a surface interiorly of said groove to determine the depth of penetration of a seated ring.

5. In a device of the class described for coaction with a connector ring having teeth projecting in opposite directions from the body thereof, the points of said teeth standing in the greatest diameters of the ring and the inner portions of the teeth sloping downwardly and inwardly to said body: a metallic body having a central opening and an annular groove to receive the teeth of the ring upon one side of the body thereof; the inner wall of said groove sloping to conform to the slope upon the said inner portions of the teeth; said body having a work-engaging surface normal to its axis to extend from the body of the connector ring at its mid portion, to limit the depth of seating of the ring.

6. In a structure of the class described, in combination: a wooden member having a bolt hole; a connector-ring seated in the material of said member substantially concentric with said hole and projecting from the surface of the member; a metallic strap having an opening surrounding said ring; a washer having a central bolt hole, and an annular groove to receive a portion of the projection of said ring; a strap contacting surface presented by a portion of said washer surrounding said groove; a central projection upon said washer concentric with the bolt hole therein projecting beyond said surface a distance substantially equal to the thickness of said strap; and a bolt clamping said washer and strap to said member.

7. In a structure of the class described, in combination: a wooden member having a bolt hole; a connector-ring seated in the material of said member substantially concentric with said hole and projecting from the surface of the member; a metallic strap having an opening surrounding said ring; a washer having a central bolt hole; said washer formed with an annular strap clamping surface adjacent its periphery and an inner axially projecting portion extending beyond said clamping surface a distance substantially equal to the thickness of said strap; said inner portion lying substantially in contact with the ring to reinforce the same; and a bolt clamping said washer and strap upon said member, about said ring.

ARTHUR C. HORNER.